May 18, 1948. K. A. HOLST 2,441,632
REVERSIBLE MOTOR CONTROL SYSTEM
Filed July 26, 1943
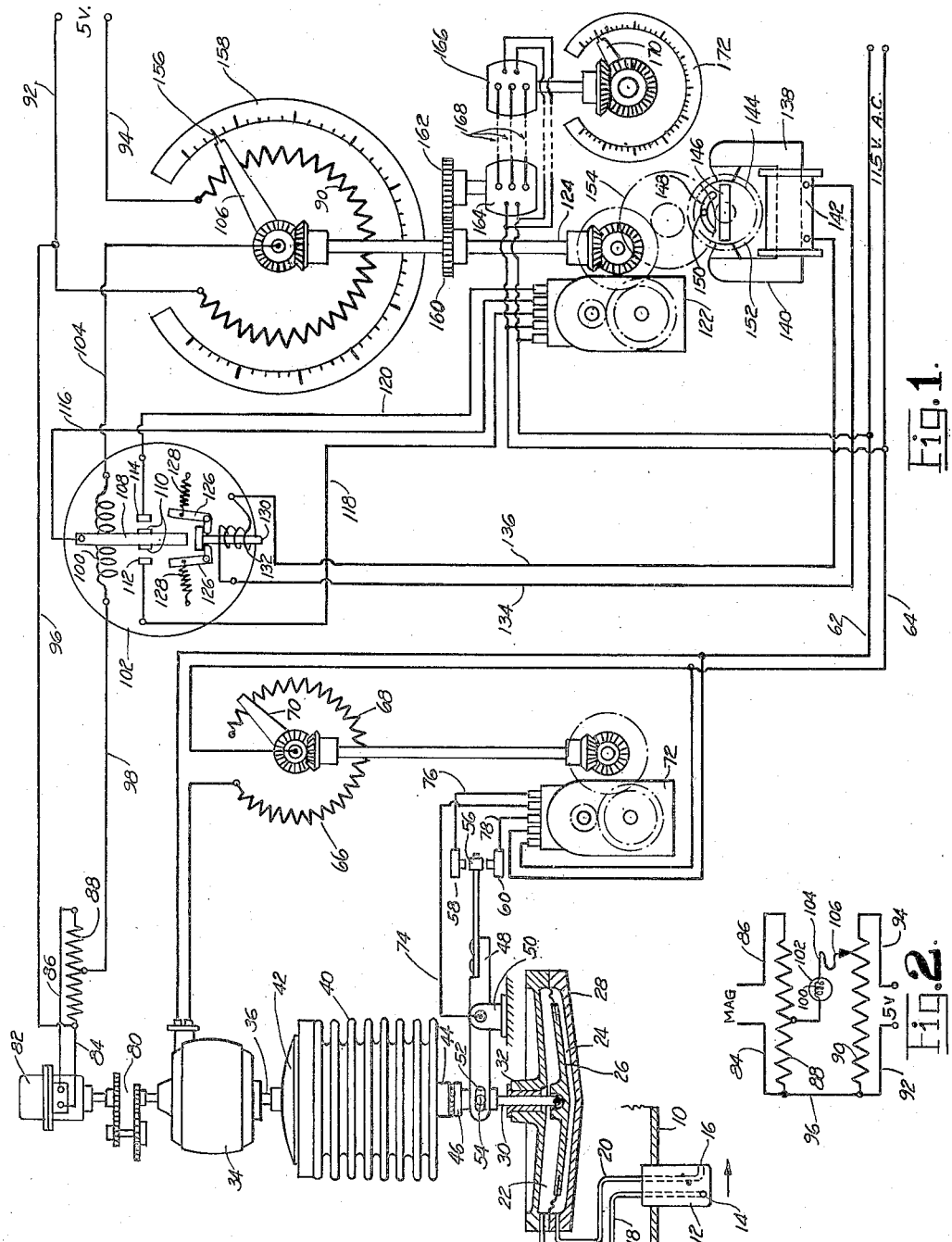
INVENTOR.
Knute Arnold Holst
BY
James C. Marble
his ATTORNEY Patented May 18, 1948

2,441,632

UNITED STATES PATENT OFFICE 2,441,632

REVERSIBLE MOTOR CONTROL SYSTEM

Knute Arnold Holst, Astoria, Long Island, N. Y., assignor to Pitometer Log Corporation, New York, N. Y., a corporation of New York Application July 26, 1943, Serial No. 496,111

1 Claim. (Cl. 318—28)

My invention relates to apparatus for accurately indicating the speed of a rotating member and more particularly to apparatus of this nature which produces sufficient power so that, if desired, the speed may be indicated at one or more stations remotely located with respect to the member.

In accordance with my invention the rotating member is connected to drive a magneto, the voltage output of which is directly proportional to its speed. This voltage is automatically balanced in a bridge circuit against a constant voltage, the adjustment of the bridge to give this balance being an indication of the voltage of the magneto, and consequently of the speed of the rotating member.

In the following description, my invention has been described as being used in connection with the speed indicator for a ship, but it will be understood that this has been done for the purpose of illustration only and that my invention may be applied to indicate the speed of any rotating member.

Further objects and advantages of my invention will be apparent from the following description considered in connection with the accompanying drawings which form a part of this specification, and of which Fig. 1 is a diagram showing a preferred embodiment of my invention; and Fig. 2 is a simplified wiring diagram of the bridge circuit included in Fig. 1.

Referring to the drawings, reference character 10 designates the hull of a ship through which extends a differential pitot member 12 of known form having a static pressure orifice 14 and a dynamic pressure orifice 16. Orifices 14 and 16 are connected by static and dynamic pressure lines 18 and 20, respectively, to chambers 22 and 24 on the opposite sides of a movable diaphragm 26 mounted in a casing 28. A pin 30 is attached to the diaphragm and passes through suitable packing 32 in casing 28 and serves to transmit force derived from the diaphragm 26 as a result of unequal pressures on opposite sides thereof.

A variable speed electric motor is indicated at 34 and has mounted on its armature shaft 36 a deeply corrugated bellows member 40 which may be of the well known "sylphon" type. The upper end of the bellows is secured to an end plate 42 which is rigidly mounted on the shaft 36, while the lower end of the bellows carries a race 44 of a thrust bearing. The other race 46 of this bearing is rigidly secured to the upper end of pin 30.

An arm 48 is pivotally mounted on standard 50 and at its lefthand end, as viewed in Fig. 1, is provided with a slot 52 which cooperates with a pin 54 extending at right angles from pin 30. The opposite end of arm 48 carries an electric contact 56 which is movable between fixed contacts 58 and 60.

Current for operating motor 34 is supplied from the conductors 62 and 64. Conductor 62 is connected directly to one terminal of the motor, while a rheostat 66 is connected in series with the conductor 64. The rheostat includes a resistance coil 68 and contact arm 70. Arm 70 may be rotated in either direction through suitable gearing by means of a reversing motor 72. This motor is supplied with current from the conductors 62 and 64. A conductor 74 connects the pivoted arm 48 to the control box of the motor 72 while conductors 76 and 78 connect the fixed contacts 58 and 60 respectively to the control box. As is well known, the connections are such that when a circuit is closed through contacts 56 and 58 the motor 72 rotates in one direction and when a circuit is closed through the contacts 56 and 60 the motor rotates in the opposite direction. The motor is stationary when both of these circuits are open.

The apparatus described above is previously known, and is fully described in my copending application, Serial No. 481,928, filed April 5, 1943, issued August 29, 1944, as Patent No. 2,357,199, and it operates as follows:

When the ship is stationary in the water, the pressures communicated through orifices 14 and 16 and conduits 18 and 20 to the opposite sides of the diaphragm 26 are the same. However, when the ship moves forward in the direction of the arrow, the dynamic pressure communicated through the orifice 16 increases while the static pressure communicated through the orifice 14 remains the same. This results in an unbalance of the pressures acting on the diaphragm 26 and consequently the diaphragm is raised by the increased dynamic pressure in the chamber 24. This pivots the arm 48 in a clockwise direction so as to complete a circuit through the contacts 56 and 60, causing the motor 72 to operate in the proper direction to turn the rheostat arm 70 so as to close the circuit through the rheostat. This supplies current to the variable speed motor 34 causing it to rotate the bellows 40. This bellows is filled with liquid, the rotation of which develops centrifugal force. The nature of the bellows is such that this force tends to expand the bellows in an axial direction, thus producing a force which is transmitted through the thrust bearing to the pin 30, which force tends to balance the force applied to the pin by the diaphragm 26. When the motor 34 attains sufficient speed so that the centrifugal force balances the force from the diaphragm, the arm 48 is pivoted so as to open the circuit between the contacts 56 and 60, thus stopping the motor 72. The rheostat arm 70 is thereby stopped and the resistance in the circuit of motor 34 remains constant. Consequently, this motor now runs at a constant speed.

Should the speed of the ship decrease, the dynamic force acting on the lower side of the diaphragm 26 decreases and consequently the centrifugal force produced by the rotation of the bellows predominates and hence the pin 30 is moved downwardly with the result that a circuit through the contacts 56 and 58 is completed. This causes rotation of the motor 72 in a direction which increases the resistance in the circuit of motor 34, thus slowing down this motor until a balance is again obtained.

Consequently, the speed of motor 34 is directly proportional to the speed of the ship.

In order to accurately determine the speed of motor 34, not only immediately adjacent to the motor, but at one or more remote stations throughout the ship, the armature shaft is connected either directly or through suitable gearing 80 to a magneto 82. The terminals of this magneto are connected by means of conductors 84 and 86 to the opposite ends of a resistance 88. Reference character 90 designates a rheostat, the terminals of which are connected by means of conductors 92 and 94 with a suitable constant voltage supply. One end of resistance 88 is connected by means of a conductor 96 with conductor 92 and hence with one end of the rheostat 90. A conductor 98 connects a tap at an intermediate turn of resistance 88 with one terminal of a coil 100 in a contact-making galvanometer designated generally by reference character 102. The other terminal of this coil is connected by conductor 104 with the contact arm 106 of the rheostat 90.

The pointer 108 of the galvanometer carries a contact 110 which is movable between fixed contacts 112 and 114. Contacts 110, 112 and 114 are connected by conductors 116, 118 and 120 with the control box of a reversing motor 122. This motor, through suitable gearing including a shaft 124 drives the contact arm 106 of the rheostat 90. Motor 122 is supplied with current from the lines 62 and 64.

Galvanometer 102 is provided with a magnetic reset which repeatedly returns the pointer 108 to its neutral position in order to prevent over-regulation. As shown diagrammatically this includes a pair of bell-crank levers 126 disposed on opposite sides of the pointer and urged away from the pointer by means of springs 128. A plunger 130 engages the horizontal arms of levers 126 and extends within a solenoid 132, the arrangement being such that when the solenoid is energized the plunger is pulled downwardly, thus pivoting the arms 126 toward the pointer 108. If the pointer is out of its neutral position because of current flowing through the coil 100, one or the other of the arms 126 strikes the pointer and returns it to neutral.

The solenoid 132 is supplied with electric impulses through the conductors 134 and 136 from an impulse generator 138. This generator includes an iron core 140 around one leg of which is wound a coil 142 to which the conductors 134 and 136 are connected. Rotatably mounted between the ends of core 140 is a disc 144 which carries a permanent bar magnet 146. Disc 144 is provided with a slot 148 having a span of about 120°. A pin 150 is mounted on a disc 152 and extends into the slot 148. Disc 152 is driven through suitable gearing 154 by the motor 122.

The contact arm 106 of the rheostat 90 is provided at its end with a pointer 156 which cooperates with a scale 158 calibrated in R. P. M., miles per hour, knots, or any other desired measuse of speed. Inasmuch as the rheostat 90 is connected to the magneto 82 only by electric conductors, this rheostat and its regulating motor 122 may be located anywhere in the ship. If it is desired to indicate the speed at additional locations, this may be done by the use of Selsyn motors, inasmuch as the reversing motor 122 may be as powerful as desired. As illustrated, a gear 160 is mounted on the shaft 124 and drives a gear 162 secured to the shaft of a Selsyn motor 164 which constitutes a sending motor. The stator of this motor may be connected to the stators of one or more receiving Selsyns 166 by means of the three phase line 168, the rotors of the Selsyn motors being supplied with alternating current from the conductors 62 and 64. Motor 166 through suitable gearing drives a pointer 170 which cooperates with a scale 172 calibrated in the same manner as scale 158. As is well known, the armature shaft of the Selsyn motor 166 will follow the shaft of motor 164 as the latter is rotated by the shaft 124. Consequently, the ratios of the various gears being properly selected, the pointer 170 will always register the same as the pointer 156.

The above described device operates as follows:

The magneto 82 being positively driven by the motor 34, rotates at a speed directly proportional to that of the motor. It is assumed that the output of the magneto 82 at maximum speed is 12 volts, while the current supplied through the conductors 92 and 94 is maintained at a constant 5 volts. The tap on the resistance 88 to which the conductor 98 is connected is so selected that when the output of the magneto is 12 volts, the voltage across the conductors 96 and 98 is 5 volts. In other words, this voltage is never greater than the constant 5 volts supplied through the conductors 92 and 94. A simplified wiring diagram of the bridge made up of the resistance 88, the rheostat 90 and the coil 100 of the galvanometer 102 is shown in Fig. 2. From this it will be seen that with a constant voltage applied to the ends of the rheostat 90, the bridge may be balanced by properly adjusting the contact arm 106 so that no current flows through the coil 100 of the galvanometer, and hence the pointer 108 remains in its neutral position. Under these conditions, if the speed of the motor 34 increases in order to balance an increase in the dynamic pressure exerted on the diaphragm 26, as previously explained, the speed of the magneto 82 is also increased and hence its voltage output is increased. This results in unbalancing the bridge and therefore current flows in one direction through the coil 100. This in turn results in a deflection of the needle 108, thus closing the circuit through the contact 110 and one of the fixed contacts, for instance, the contact 112. This in turn causes the motor 122 to rotate, thus turning the contact arm 106 in the proper direction to restore the balance of the bridge, and hence the setting of the arm 106 bears a definite relationship to the speed of the magneto 82. As above stated, the scale 158 may be calibrated so as to indicate this speed in R. P. M. or it may be calibrated so as to indicate directly the speed of the ship, inasmuch as the latter is directly proportional to the speed of the magneto.

Should the speed of the ship, and hence the speed of the magneto 82 decrease, current will flow through the coil 100 in the opposite direction, thus causing deflection of the needle 108 so as to close the circuit through the contacts 110 and 114. This causes the motor 122 to rotate in the opposite direction from that previously assumed, and hence the arm 106 is driven in the opposite direction so as to restore the balance of the bridge.

Whenever the motor 122 is rotating, the disc 152 is rotated through the gearing 154. The pin 150, which is fixed to the disc 152 moves within the slot 148 until it strikes one end of the latter, whereupon the disc 144 and the bar magnet 146 are caused to rotate with the disc 152. From the position of the parts shown in Fig. 1, this rotation is at first resisted by the magnetic attraction of the magnet 146 for the core 140. However, as soon as the magnet has been turned through slightly more than 90°, the attraction of the magnet for the core accelerates the rotation of the former through the next 90°. Inasmuch as the slot 148 has a span of more than 90°, the disc 144 and the magnet 146 may so accelerate with respect to the pin 150 and disc 152. The properties of the impulse generator 138 are so chosen that when the magnet 146 is being driven by the disc 152, its speed of rotation is not high enough to induce a sufficient current in the coil 142 to actuate the plunger 130. However, when the magnet turns at the accelerated rate, as above described, sufficient current is induced in the coil 142 to produce enough magnetic force in the solenoid 132 to pull the plunger 130 down, thus pivoting the arms 126 so as to reset the pointer 108 to its neutral position against any deflecting force caused by the flow of current through the coil 100. Consequently, as long as the motor 122 is rotating, a series of electric impulses are supplied to the solenoid 132 and hence the pointer 108 is continuously reset to its neutral position, thus preventing over-regulation. On the other hand, whenever the motor 122 is stationary no impulse is supplied and consequently unnecessary wear of the resetting mechanism in the galvanometer is avoided.

In view of the fact that the reversing motor 122 may be designed to develop as much power as desired, it may be employed to actuate suitable speed control mechanism to maintain the speed of the ship constant.

While I have shown and described one preferred embodiment of my invention it is to be understood that this has been done for the purpose of illustration only and that the scope of my invention is not to be limited thereby, but is to be determined from the appended claim.

What is claimed is:

A reversible motor control system comprising a reversible motor, a galvanometer relay, connections between said motor and said relay, means for periodically resetting said relay during continuing operations of said motor comprising electromagnetic means for moving the armature of said relay to mid position, an electric impulse generator driven by said motor, and conductor means for supplying electrical impulses from said generator to said electromagnetic means whereby the latter is operated to reset said relay only when said motor is running.

KNUTE ARNOLD HOLST.

REFERENCES CITED

The following references are of record in the file of this patent:

UNITED STATES PATENTS

| Number | Name | Date |
|---|---|---|
| 1,164,032 | Thomas | Dec. 14, 1915 |
| 1,553,407 | Staege | Sept. 15, 1925 |
| 1,605,038 | Kleckner | Nov. 2, 1926 |
| 1,793,586 | Burger | Feb. 24, 1931 |
| 2,077,086 | Adair | Apr. 13, 1937 |
| 2,246,516 | Herzog | June 24, 1941 |
| 2,325,401 | Hurlsteon | July 27, 1941 |
| 2,331,934 | Satterlee | Oct. 19, 1943 |
| 2,339,743 | Norman | Jan. 18, 1944 |